United States Patent [19]

Oliker

[11] Patent Number: 4,601,732
[45] Date of Patent: Jul. 22, 1986

[54] APPARATUS FOR RECOVERING DILUTE SPECIES IN A FLUID STREAM

[75] Inventor: Michael D. Oliker, Amesbury, Mass.

[73] Assignee: Near Equilibrium Research Associates, Amesbury, Mass.

[21] Appl. No.: 675,466

[22] Filed: Nov. 28, 1984

Related U.S. Application Data

[60] Continuation of Ser. No. 484,184, Apr. 12, 1983, abandoned, and a continuation-in-part of Ser. No. 361,134, Mar. 24, 1982, which is a division of Ser. No. 166,054, Jul. 7, 1980, Pat. No. 4,324,564.

[51] Int. Cl.$^4$ .............................................. B01D 53/04
[52] U.S. Cl. ......................................... 55/20; 55/62; 55/70; 55/73; 55/74
[58] Field of Search .................... 55/18, 20, 21, 33–35, 55/60, 62, 74, 75, 77, 79, 161–163, 179–181, 208, 387, 389, 390, 70, 73

[56] References Cited

U.S. PATENT DOCUMENTS

| | | | |
|---|---|---|---|
| 2,535,902 | 12/1950 | Dailey, Jr. | 55/33 |
| 2,562,334 | 7/1951 | Roberts | 34/34 |
| 2,675,089 | 4/1954 | Kahle | 55/62 |
| 2,699,837 | 1/1955 | Van Note | 55/33 X |
| 2,880,818 | 4/1959 | Dow | 55/62 |
| 3,061,992 | 11/1962 | Russell | 55/62 X |
| 3,137,549 | 6/1964 | Kilgore et al. | 55/62 X |
| 3,177,631 | 4/1965 | Tamura | 55/79 X |
| 3,193,985 | 7/1965 | Siggelin | 55/33 |
| 3,216,178 | 11/1965 | Sauty | 55/33 |
| 3,323,288 | 6/1967 | Cheung et al. | 55/62 X |
| 3,359,706 | 12/1967 | Zankey | 55/20 |
| 3,405,507 | 10/1968 | Spencer et al. | 55/180 X |
| 3,446,031 | 5/1969 | Chi et al. | 55/34 X |
| 3,542,525 | 11/1970 | Pigford et al. | 55/62 X |
| 3,577,867 | 5/1971 | Barrere, Jr. | 55/180 X |
| 3,712,027 | 1/1973 | Hasz | 55/33 |
| 3,738,084 | 6/1973 | Simon et al. | 55/31 |
| 3,808,773 | 5/1974 | Reyhing et al. | 55/31 |
| 3,850,592 | 11/1974 | Huffman | 55/33 |
| 3,950,154 | 4/1976 | Henderson et al. | 55/33 X |
| 4,012,206 | 3/1977 | Macriss et al. | 55/34 |
| 4,030,896 | 6/1977 | Wimber et al. | 55/33 |
| 4,165,972 | 8/1979 | Iles et al. | 55/179 X |
| 4,233,038 | 11/1980 | Tao | 55/33 |
| 4,324,564 | 4/1982 | Oliker | 55/35 X |

FOREIGN PATENT DOCUMENTS 1670 1/1979 Japan .................................... 55/180

OTHER PUBLICATIONS

D. Basmadjian, On the Possibility of Omitting the Cooling Step in Thermal Gas Adsorption Cycles, Can. J. of Chem. Eng., vol. 53, Apr. 1975, pp. 234–238.
Lukchis, Adsorption Systems, Part I, Chemical Engineering, Jun. 11, 1973, pp. 111–116.
Lukchis, Adsorption Systems, Part II, Chemical Engineering, Jul. 9, 1973, pp. 83–87.
Lukchis, Adsorption Systems, Part III, Chemical Engineering, Aug. 6, 1973, pp. 83–90.
Johnston, Designing Fixed-Bed Adsorption Columns, Chemical Engineering, Nov. 27, 1972, pp. 87–92.
Wankat, The Relationship Between One-Dimensional and Two-Dimensional Separation Processes, AIChE Journal, vol. 23, No. 6, pp. 859–867.
Collins, The LUB/Equilibrium Section Concept for Fixed-Bed Adsorption, Chemical Eng. Progress Symposium Series, vol. 63, No. 74, pp. 31–35.
Rhee et al., An Analysis of an Adiabatic Adsorption Column, Chemical Eng. Journal (1) 1970, pp. 279–290.

*Primary Examiner*—Robert Spitzer
*Attorney, Agent, or Firm*—Lahive & Cockfield

[57] ABSTRACT

Disclosed are sorption bed systems and methods of operating sorption bed systems of the type used to remove and recover plural dilute species from a fluid stream. The system comprises a main bed which is loaded during sorption duty, and a sorbate recovery, main bed-regeneration apparatus comprising a second sorption bed for separating the dilute sorbates, a sorbate collecting device such as a condenser, and optionally, when regeneration and sorbate recovery is conducted in a recirculating fluid mode, a third sorption bed downstream of the sorbate collecting device for improving the yield of sorbate recovery. Practice of the invention is characterized by a significantly reduced heat consumption and the collection of sorbate fractions of improved purity.

16 Claims, 14 Drawing Figures

APPARATUS FOR RECOVERING DILUTE SPECIES IN A FLUID STREAM

REFERENCE TO RELATED APPLICATIONS

This application is a continuation of Ser. No. 489,184, filed Apr. 12, 1983 now abandoned and is a continuation-in-part of U.S. Ser. No. 361,134 filed Mar. 24, 1982, which is a divisional of Ser. No. 166,054, filed July 7, 1980 now U.S. Pat. No. 4,324,564 entitled Adsorption Beds and Method of Operation Thereof issued Apr. 13, 1982. Filed on even date herewith are related U.S. application Ser. Nos. 484,176, 484,159, and 484,186. The disclosure of all of the foregoing are incorporated herein by reference.

BACKGROUND OF THE INVENTION

This invention relates to the recovery of plural dilute sorbable species from a fluid stream, e.g., the recovery of petroleum fractions such as pentane and hexane from natural gas streams. More particularly, the invention relates to exploiting the physical chemistry insights disclosed in U.S. Pat. No. 4,324,564 in the context of sorption bed systems designed to remove dilute sorbable species from a fluid stream and to recover valuable components of the sorbable species.

Sorbents are widely used for the purification of fluid mixtures. The sorbent material or materials, typically in particulate form or fixed on a support, are contained in a vessel which provides means for passing fluid along a flow path through the interstices among the solids in the bed. A fluid feed stream containing one or more dilute species (sorbates) to be removed, typically at cumulative concentrations no greater than about 15 percent, is introduced into the bed and passed along the flow path in a sorption stage. Inside the bed sorption waves or fronts form which pass along the flow path from a point adjacent the bed entrance in the same direction as the fluid flow, but at a much slower rate.

These sorption fronts are the bed regions wherein changes in sorbent loading and sorbate content in the fluid phase occur. Each front's upstream side is bounded by a bed region characterized by sorbent loadings, sorbate to fluid feed mole ratios, and temperatures characteristic of equilibrium between the sorbent material and the feed. On its downstream side, the sorption front is bounded by a bed region having properties characteristic of equilibrium between the sorbent material and the substantially sorbate-free fluid product. Front boundaries are generally not well defined but rather comprise regions which asymptotically approach equilibrium. As the downstream boundary of the fastest sorption front approaches the bed exit, the concentration of sorbate in the product begins to rise. When the concentration of the sorbate in the product at the exit exceeds some predetermined specification, sorption is discontinued and the bed is regenerated.

In the regeneration stage, a regenerant comprising a hot fluid is passed along the flow path in a cocurrent, or more commonly in recovery operations a countercurrent direction. The high temperature of the regenerant produces a desorption front in the bed which drives sorbate off the surface of the sorbent material and into the flowing regenerant stream. This process continues until the bed is substantially sorbate-free, typically as indicated by the emergence of hot regenerant fluid at the bed exit. The hot, sorbate-free bed is then either cooled or utilized for sorption service while still hot. The introduction of a coolant fluid produces a thermal front which takes heat from the bed.

Sorption bed systems of the type described above are known as "thermal swing" systems because they are regenerated with heat. They have been widely utilized in various industries. For example, natural gas contaminated with water, acid gases, and higher molecular weight hydrocarbons are often treated prior to liquification or delivery to a pipeline to remove the contaminates using a sorption bed system. In situations where the higher molecular weight hydrocarbon content of the gas is high enough to justify economically the capital and energy cost of recovery, such sorption bed systems have been designed to remove the hydrocarbons in a condenser or the like for subsequent separation and purification. Such systems are typically operated with very short sorption and regeneration cycles.

U.S. Pat. No. 4,324,564 discloses and claims a method of operating sorption beds (the Four Front method) having many significant advantages. In the context of this invention, chief among the advantages characteristic of the Four Front operational method is that significantly less heat is required for regeneration and that "waste" exiting the sorption bed during regeneration is emitted in a less massive, more concentrated pulse, having a lower average temperature.

SUMMARY OF THE INVENTION

The instant invention provides sorption apparatus and methods of operating the apparatus designed to reduce heat consumption and to improve both the quality and quantity of recovered sorbates.

In its broadest aspects, the invention comprises a main bed which is loaded during sorption duty with a plurality of sorbates removed from a fluid feed stream. The main bed is regenerated and sorbates are recovered by means of a second bed which is placed on line during regeneration. Regeneration of the main bed is conducted generally as taught in U.S. Pat. No. 4,324,564. Thus, a hot regenerant fluid is passed countercurrently through the main bed to create within the bed desorption fronts wherein respective sorbates are stripped off the bed and redeposited downstream. Prior to the time the last desorption front associated with a loaded sorbate breaks through the end of the bed, a cooling gas stream is introduced. As regeneration continues, the sorbate having the lowest affinity for the sorbent material, together with smaller concentrations of the other sorbates, is transported by the fluid stream into the second bed, which has been previously regenerated by the hot gas stream.

As the temperature of the second bed drops, regions of sorbate loading develop and move through the bed in the direction of fluid flow. However, because of the difference in sorption-desorption properties of the various sorbates, and because the sorbate of lowest affinity encounters the heat first, the sorbate of lowest affinity leaves the main bed first, again contaminated to some degree by one or more other sorbates. However, the effect of the second bed is to purify further the first sorbate. As fluid flow continues, pulses of effluent rich in a selected one of said sorbates sequentially leave the second bed. Downstream, a sorbate collector such as a condenser, optionally employing a refrigerated coil and optionally integrated with an absorber or a distillation apparatus, extracts sorbate from the fluid flow.

The invention may be embodied in apparatus wherein regeneration and sorbate recovery is conducted by a recirculating fluid stream, by a non-recirculated separate stream such as a stream taken from product leaving an associated main bed in sorption duty, or by a combination of recirculating and non-recirculating fluid flows. In the former case, a third bed may be included in the recirculating loop, downstream from the sorbate collection device, for purposes of improving sorbate yield. When a third bed is used, it traps sorbate not collected in the condenser, and delivers the sorbate to a main bed at the beginning of the next regeneration cycle.

The regeneration may be controlled by means of a sensor disposed within the main bed, e.g., a thermal probe, which serves to inactivate the heater used to create the hot regenerant. The sensor is preferably positioned in the main bed such that it is triggered by the passage or creation of a desorption front. At that time heating is discontinued.

The system of the invention preferably is designed such that fluid feed can be processed continuously. In one embodiment, plural main beds and appropriate valving are provided such that a subset of the main beds is in sorption duty while the others are being regenerated, and after regeneration is complete in one or more beds, the fluid flows are altered.

In an important embodiment of the invention, the system treats natural gas to remove water, higher molecular weight hydrocarbons, acid gases, such as $CO_2$, $SO_x$ $H_2 S$ or $NO_x$, and/or ammonia, and collects fractions rich in e.g., pentane, hexane, and heptane.

Accordingly, it is an object of the invention to provide a thermally efficient system and method of recovering dilute sorbates from a fluid stream as plural fractions rich in a selected sorbate. Another object is to improve the yield of recovered sorbates in sorption bed hydrocarbon recovery systems. Still another object is to provide a sorption bed system design which can exploit the Four Front System. Another object is to provide in a system of the type described a second bed used during regeneration which serves to promote regeneration of sorbates and is automatically regenerated. These and other objects and features of the invention will be apparent from the description and claims which follow and from the drawing.

BRIEF DESCRIPTION OF THE DRAWING

Like reference characters in the respective drawn figures indicate corresponding parts.

DESCRIPTION

Figure 1:
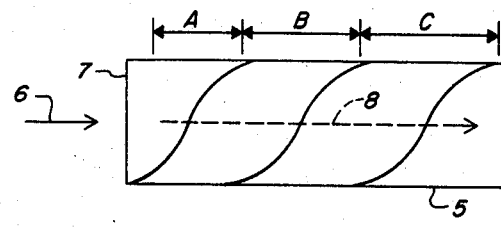
FIG. 1 is a schematic illustration of a sorption bed useful in describing the sorption stage and the concept of a front wherein bed loading (weight ratio of sorbate to sorbent) is depicted graphically on the bed's vertical axis.

The following disclosure deals primarily with purification of natural gas streams and recovery of higher molecular weight hydrocarbons. However, the principles on which the invention is based have general application to any volatile liquid substance that can be sorbed on an adsorbent solid or an absorbent immobilized on a solid support, and desorbed by heating. Accordingly, the following disclosure of a natural gas, hydrocarbon mixture as the fluid feed is not intended to limit the invention. Also, the description of the exemplary natural gas/hydrocarbon treatment system which follows is somewhat idealized and simplified for clarity of explanation. In view of this disclosure, those skilled in the art will be able to design various specific sorption bed systems to exploit the invention by the application of conventional engineering principles, modeling techniques, and empirical techniques of design optimization.

Prior art sorption bed hydrocarbon recovery systems typically feature thermal swing regeneration using a recirculating regeneration stream. These systems comprise multiple main beds with appropriate valving such that while one or more beds are in sorption duty, the others are being regenerated. On completion of regeneration and hydrocarbon recovery, the valves alter fluid flows to put the freshly regenerated beds in sorption duty and to regenerate and recover the sorbates from the loaded beds.

The regeneration and sorbate recovery loop in such systems typically comprises a blower, a condenser, and a heater arranged in series. At the beginning of regeneration, the heater and the blower are actuated. Fluid circulated past the heater enters the bed in a direction countercurrent to the feed fluid flow. The condenser is actuated upon the appearance in the bed effluent of substantial concentrations of sorbates. Sorbates in the stream are thus condensed and withdrawn downstream, and the effluent again passes the heater and reenters the bed. This hot circulation is continued until the temperature of the effluent from the bed approaches the temperature of the hot regenerant, signaling that desorption of the bed is complete. At that time, the heater is turned off. Continued circulation cools the bed as the condenser absorbs heat from the fluid stream. When the bed temperature or the temperature of the effluent drops to a designated level, the bed is ready for sorption duty.

As disclosed in the above-referenced U.S. patent, the phenomena of sorption and desorption in beds takes place through the medium of waves or fronts which traverse the bed volume in the direction of fluid flow but move at a much slower rate. These consist of profiles or spacial variations in the concentration of sorbate (y) in the fluid feed, loading of the sorbate on the solid (l), and temperature of the solid and fluid (T). A front consists of a transition from one equilibrium condition in the bed to another. From the midpoint of the front, each equilibrium condition is approached asymptotically. As the front moves, the sorbent material and the fluid in the bed exchange heat and mass. During the sorption stage, the upstream region of the bed that is near equilibrium with the fluid feed grows progressively larger while the downstream region that is near equilibrium with the fluid product grows progressively smaller. The product fluid exiting the bed is thus substantially in equilibrium with the original (pre-sorption) condition of the bed. As sorption continues, the product exiting the bed moves progressively further from this equilibrium state as the front approaches the bed exit and in the extreme (as the sorption front breaks completely through) approaches a composition identical to the feed. In any industrial operation, the sorption stage is terminated well before breakthrough.

For convenience, the various fronts discussed herein are named for the equilibrium conditions which bound them, with F representing feed, R representing regenerant, P representing product (and coolant fluid), and W representing sorbate-rich "waste". Thus, for example, the sorption front described above is termed an FP front. The speed of a front in the direction of flow can be defined on the basis of a mass balance or heat balance. Regarding the mass balance, the sorbate lost by the fluid in passing through a unit volume containing the front must equal the sorbate gained by the sorbent (increased bed loading) which results from the motion of the front. Thus, where $v_l$ is the loading velocity in mass of sorbent traversed by the front per unit time, $m_f$ is the fluid flow rate in mass of product gas per unit time, $\Delta y$ is the fluid concentration transition (the change in sorbate concentration of the fluid measured across the front), and $\Delta l$ is the loading transition across the front, $$v_l = m_f(\Delta y/\Delta l)$$

Regarding the heat balance, the thermal velocity can be defined by balancing the fluid enthalpy lost with the bed heat gained, where fluid enthalpy is the sum of sensible heat plus latent heat due to the presence of sorbate. Thus, when $v_T$ equals thermal velocity, $Cp_s$ and $Cp_f$ are the respective heat capacities of the solid and fluid, and $-\Delta H$ is the heat of sorption, $v_T(Cp_s\Delta T) = m_f[Cp_f\Delta T + (-\Delta H)\Delta y]$. Thus, $v_T = m_f(Cp_f/Cp_s + (-\Delta H)/Cp_s \cdot \Delta y/\Delta T)$. If the ratio of the heat capacities of the fluid and solid is defined as C and the ratio of the heat of sorption to the heat capacity of the solid defined as H, then $$v_T = m_f(C + H\,\Delta Y/\Delta T)$$

From the foregoing it is apparent that when $\Delta y$ is equal to zero (i.e., when no sorption or desorption is taking place), thermal velocity depends only on the fluid flow rate and the ratio of the heat capacities of the fluid and solid: $v_t = m_f C$. When $\Delta y/\Delta T > 0$, a "fast front" results; when $\Delta y/\Delta T < 0$, a "slow front" results. Thermal velocity and mass velocity in some cases can be equal. Also, fronts can grow or contract and do not have sharp boundaries.

Referring to FIG. 1, some characteristics of a typical FP front are illustrated. Fluid feed entering bed 5 in the direction of arrow 6 (left to right) at feed entrance 7 passes along the fluid flow path 8 and leaves the bed via exit 9. The lengths of the sorption front at various times during its passage along flow path 8 are shown at A, B, and C. As illustrated, as the front passes through the bed, the fraction of bed length where a loading gradient appears may grow progressively larger. Downstream of the front, conditions of l, y, and T are characteristic of equilibrium between the sorbent and the product. Upstream of the front the values of l, y, and T are characteristic of equilibrium between the sorbent and the feed. During sorption, $\Delta l$ and $\Delta y$ across the front in the direction of flow are negative. The length of bed remaining (as measured from the midpoint of the front) when sorption is terminated determines how much of the bed is left unloaded.

When two or more sorbates having differing affinities for the sorbent material are introduced together, $\Delta y/\Delta l$ across each of their sorption fronts differs and the fronts will have differing velocities. Similarly, each sorbate has a unique equilibrium loading level. Thus, a sorbate having a relatively small affinity for the sorbent material will exhibit a lower loading concentration, and its FP front will be faster than a sorbate having a greater affinity for the sorbent material. Accordingly, in hydrocarbon recovery operations, the length of time it takes the FP front of the lowest molecular weight sorbate of interest to traverse the bed without breaking through limits the duration of the sorption stage. Consequently, such systems employ fast cycles, even for large beds containing alumina or silica gel.

Thus, during sorption duty, loaded regions of the respective sorbates form along the length of the flow path in the mass of sorbent material. Methane is already in equilibrium with the cool bed. Ethane, propane, and butane in the gas, having increasingly greater affinity for the sorbent material, consecutively create FP fronts, each of which move along the bed and displace in part the sorbate loadings encountered. As the sorption stage continues, pentane, hexane, higher hydrocarbons, and water form FP fronts, displacing loadings of less tenaciously held sorbates as they move. If pentane is the lowest molecular weight sorbate to be recovered, then the sorption stage is terminated prior to the time the pentane loaded region exits the bed. At this point, the loading profiles in the bed are arranged, for example, as schematically illustrated in the bed 26 to the left in FIG. 6A.

As shown, a first sorbate 1, e.g., pentane, is loaded in low concentration adjacent the bed's exit (regenerant stream entrance). A second sorbate 2, e.g., hexane, is loaded in a separate region which overlaps region 1 and is more concentrated than 1. A third sorbate 3, e.g., heptane, is loaded in another region, and overlaps region 2. Lastly, a fourth sorbate 4, having a greater affinity for the sorbent material than sorbates 1, 2, and 3, e.g., water, is loaded in a separate region in high concentration adjacent the bed's fluid feed entrance (and regenerant stream exit). Sorbates of higher molecular weight, if present in the fluid feed, may be loaded together with sorbates 3 and 4. The bed is now ready for regeneration, recovery of sorbates 1, 2, and 3, and removal of sorbate 4. The section of the bed between the left end of sorbate region 1 and the fluid feed entrance of the bed is in equilibrium with product (P) and represents unused bed.

Figure 2A:
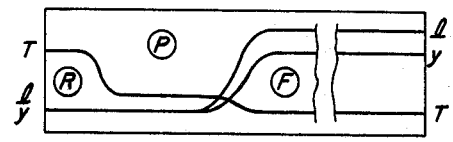
FIG. 2A-2C are schematic diagrams illustrating the sequence of events which occurs during regeneration of a sorption bed in the conventional (prior art) manner. The horizontal axis represents the length of the bed and the vertical axis represents increasing (upward) temperature (T), bed loading (l) and sorbate-fluid feed mole ratio (y).
Figure 2B:
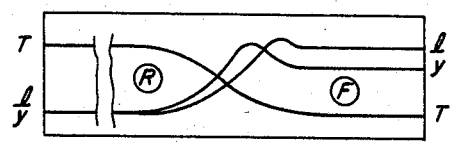
Figure 2C:
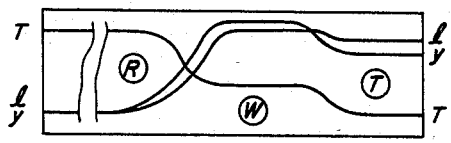

FIGS. 2A-2C comprise a series of diagrams illustrating changes in bed loading, sorbate concentration in the fluid, and temperature during regeneration of a bed loaded with one sorbate. In the situation illustrated, regeneration is conducted with a substantially sorbate-free hot fluid followed by a sorbate-free cooling fluid. However, both in the prior art and in the method of this invention, the hot regenerant fluid and cooling fluid need not necessarily be sorbate-free.

As shown in FIG. 2A, regeneration starts as a hot dry regenerant fluid (R), enters the bed in a countercurrent direction to the sorption stage flow. As the fluid enters the flow path, it first encounters the unused bed which is cool and substantially unloaded, giving rise to a pure thermal front designated RP. $\Delta y$ in this region is substantially zero, so the RP front moves at or slightly greater than velocity $m_f C$.

The RP front immediately begins to collide with the less loaded end of the sorption front, then moves into progressively more loaded regions. This front, designated PF, is illustrated in FIG. 2A, and is bounded by a bed region wherein T, y, and l are characteristic of equilibrium with feed (section F) and by a bed section wherein T, y, and l have values characteristic of equilibrium between the sorbent and product (section P). As shown in FIG. 2B, the collision of the RP and PF fronts causes an increase in the equilibrium fluid concentration (y). Sorbate is stripped off the bed but is resorbed downstream, heating and loading the bed.

As the RP front collides and passes through the PF front, a pair of new fronts are created, designated RW and WF (FIG. 2C). Front WF is a fast front (velocity $> m_f C$) bounded by downstream bed conditions characteristic of equilibrium with the feed and upstream bed conditions characteristic of equilibrium with sorbate-rich "waste" fluid produced during regeneration. The RW front is a slow desorption front bounded by a downstream bed section in equilibrium with waste and an upstream section in equilibrium with regenerant fluid. As illustrated, region W of the bed appears as a plateau in which the equilibrium temperature of the bed is intermediate that of the regenerant fluid and the feed fluid, and bed loading and sorbate concentration are high. Because of the difference in speed between the WF and RW front, the plateau represented by the region W lengthens as regeneration continues. The collision and transformation of the fronts are of course not instantaneous. Also, plateau W may exhibit variations as the new fronts contract and expand during formation.

Fast front WF quickly passes through the bed and breaks through the bed exit, at which time a small increase in the temperature and a large increase in sorbate concentration of the effluent is observed. As regenerant fluid continues its passage through the bed, the RW front moves therealong. Its breakthrough is signaled by a decrease in sorbate concentration in the effluent and an increase in its temperature approaching that of the hot regenerant.

In the prior art, the observed change in effluent characteristic of the breakthough of the RW front serves as the signal to stop the flow of hot regenerant fluid and to begin cooling the bed back down to its operational temperature. Thus, as cool dry fluid is fed along the bed's flow path, a cooling front passes rapidly therealong. Since $\Delta y$ and $\Delta l$ across this cooling front are essentially zero, the front is essentially a pure thermal front having a speed close to $m_f C$. While the thermal front is traversing the bed, the last vestiges of the RW front break through. When the thermal wave breaks through, the regeneration is complete, and the bed is ready for a return to the sorption stage.

Regeneration in accordance with the Four Front method requires that the cooling front be introduced prior to the time the RW front exits the bed. Preferably, the introduction of cooling fluid is timed such that the slow RW front is breaking through as the fast cooling front reaches the end of the bed and collides with it. The effect of this alteration in timing is to utilize sensible heat in the bed to complete the desorption.

Figure 3:
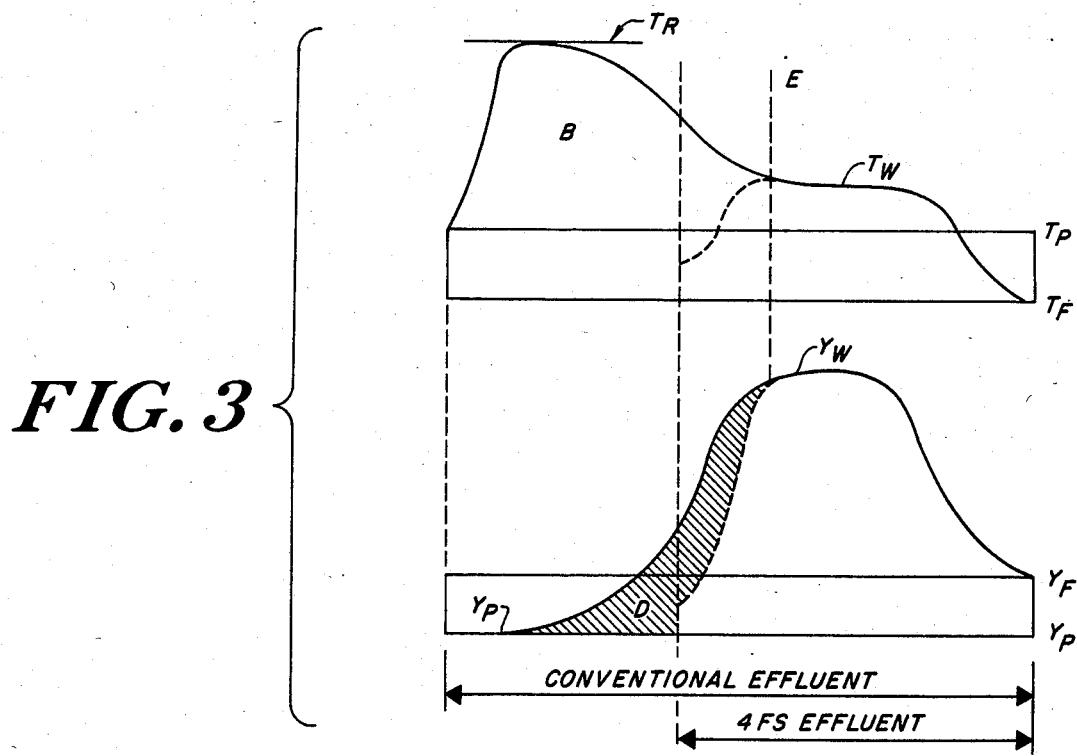
FIG. 3 is a graph illustrating the sorbate/fluid mole ratio and temperature (vertical axis) of the effluent stream exiting a sorption bed during the regeneration stage during a prior art conventional cycle and a Four Front regeneration cycle as disclosed in the above-referenced patent.

The effect on the waste stream (which contains the sorbates to be recovered) of operating in accordance with the Four Front method versus conventional operation may be understood from FIG. 3, a diagram depicting the temperature and sorbate concentration properties of the effluent during regeneration in terms of the mass of fluid removed from the bed. The solid lines represent conventional operation; the dashed lines represent the departure from conventional operation characteristic of the Four Front System.

Starting at the right and moving toward the left, it can be seen that the conventional regeneration stage effluent initially has a sorbate concentration (y) and temperature (T) corresponding to the feed. The effluent then undergoes an increase in sorbate concentration from $y_F$ to $y_W$ and an increase in temperature from $T_F$ to $T_W$. This change is caused by the breakthrough of the fast WF front. Next, the warm ($T_W$), sorbate-rich ($Y_W$) plateau comes through for a time until the RW front breaks through, signaling the controller to switch to coolant. As the RW front breaks through, sorbate concentration in the effluent decreases to the level of the product; the temperature rises until it is substantially equal to the temperature of the regenerant gas ($T_R$) and remains at this level until the cooling wave comes through, lowering the temperature of the effluent to that of the product.

Using the Four Front method, at the outset the curves are identical to the conventional method of regeneration. However, at point E there is a marked departure from conventional behavior. Specifically, the effluent exhibits a brief rise and then a rapid decline in temperature to a level somewhere intermediate the temperature of the product and feed, and the sorbate concentration in the effluent decreases rapidly as compared with the conventional method. The predominant effect of these changes is a large heat saving equal to Area B and a slight reduction in the total sorbate contained in the effluent represented by Area D. Note also that the temperature of the effluent need not ever attain $T_R$, the temperature of the hot regenerant. Area D represents the residual mass left in the bed after regeneration. The residual mass may be recovered in the next cycle. This mass of sorbate will be contained in a region of the bed adjacent the feed entrance.

Note that the mass of fluid effluent exiting the bed during Four Front regeneration is much smaller as compared to conventional regeneration, that its average temperature is lower, and that its average sorbate concentration is higher. These attributes of Four Front regeneration are all advantageous in the context of sorbate recovery. Thus less heat is used during regeneration, and the condenser or other cooling device employed in recirculating regeneration has less work to do in order to cool the recirculating stream. Furthermore, the condenser or other collector of sorbate never contacts hot-dry effluent and thus can operate more efficiently.

Figure 4:
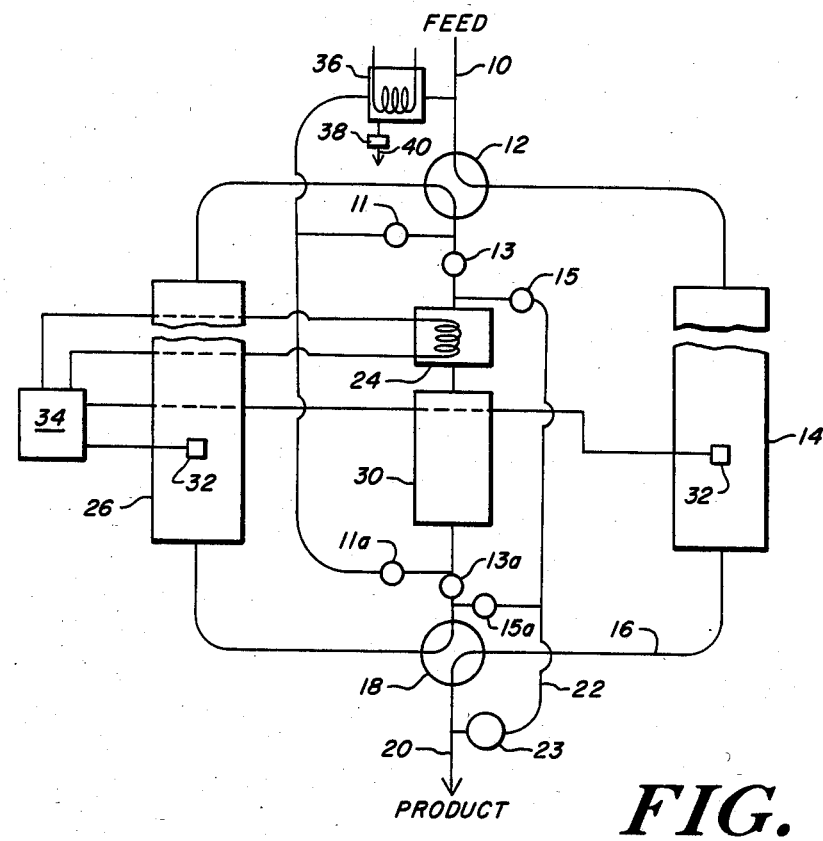
FIG. 4 is a schematic diagram illustrating apparatus constructed in accordance with the invention.

Referring to FIG. 4, a first embodiment of the apparatus of the invention is illustrated. It comprises a feed stream 10 which passed through valve 12 and a main bed 14 in sorption duty. Within bed 14, FP fronts form and regions of sorbate loading such as are depited in FIG. 6A develop along the bed mass in the direction of flow of the feed. Product fluid of a reduced sorbate concentration relative to the feed exits through stream 16, passes through a valve 18, and is delivered for subsequent use through line 20.

Regeneration of second main bed 26 starts by closing valves 11a, 13, 15a, opening valves 11, 13a, and 15, and actuating heater 24. Sorbate collector 36 is here illustrated as a single condenser. A portion of the product gas, now substantially sorbate-free, is directed from line 20 to form stream 22, by fluid mover 23. Product gas thus flows through valve 15 and heater 24 producing hot regenerant fluid, which passes through second sorption bed 30, stripping any sorbates it contains, and leaving it hot and dry. Hot regenerant then exits the second bed 30, passes through open valve 13a and valve 18, and enters loaded main bed 26. Optionally, during the time sorbate on bed 30 is being driven out by the hot regenerant fluid, valve 13a may be closed and 11a opened so that sorbate from second bed 30 is condensed in sorbate collector 36. After it is condensed, the valves 13a and 11a are reversed. Effluent exiting main bed 26 as stream 28 at the outset has a composition substantially identical to the fluid feed. Hot regenerant in the main bed 26 first collides with sorbent material in equilibrium with product (the unused bed portion) forming a fast RP front. The RP front collides with an FP loading front forming two new fronts, a slow RW front and a fast WF front. As the fast WF front breaks through, the sorbate concentration of the effluent in line 28 increases and the temperature of the effluent rises. Should a WF front break through, fluid carrying the now increased sorbate content passes through open valve 11 and through condenser 36, where its sorbate content is reduced and the effluent is returned to feed line 10.

At some point during the time an RW front is still in main bed 26, the heater 24 is inactivated so that unheated product enters and cools second bed 30. When second bed 30 is cool, valves 11a, 13 and 15a are opened and 11, 13a, and 15 are closed. Upon switching of the valves, cool product flows through open valve 15a and into bed 26. This creates a fast cooling front which eventually collides with the slowest RW front, preferably immediately adjacent the effluent exit end of the bed 26 feeding stream 28. At that point regeneration of main bed 26 is complete. Optionally, the switching from hot regenerant to cooling flow may be conducted automatically by means 32 for sensing an intrinsic property of fluid within the bed, e.g., a temperature probe. Appropriate placement of the temperature probe within bed 26 results in a signal generated in response to the passage of, e.g., the RW front. The signal is delivered to controller 34 which inactivates heater 24.

Sorbates in the effluent stream 28 during the cooling stage pass through open valve 13, inactivated heater 26, and are delivered to second sorption bed 30 where, as explained hereinafter, they are again sorbed as overlapping loading regions. Continued circulation of fluid through open valve 11a produces sequential pulses of effluent rich in a selected one of the sorbates which are delivered to the sorbate collector 36. In systems designed to collect low boiling sorbate fractions, condenser 36 may comprise a refrigeration coil. Liquid fractions rich in one of the sorbates are collected from condenser 36 by intermittently opening a valve 38 in a sorbate collection line 40. Collection line 40 may lead to an absorber (not illustrated) or to trays in a distillation apparatus (not illustrated) where the sorbates are purified further.

Fluid exiting condenser 36 will typically have a small sorbate concentration and accordingly is preferably delivered to feed stream 10. When regeneration and sorbate recovery is complete, valves 12 and 18 are turned to place bed 14 in the regeneration stage and bed 26 in sorption duty.

Figure 5:
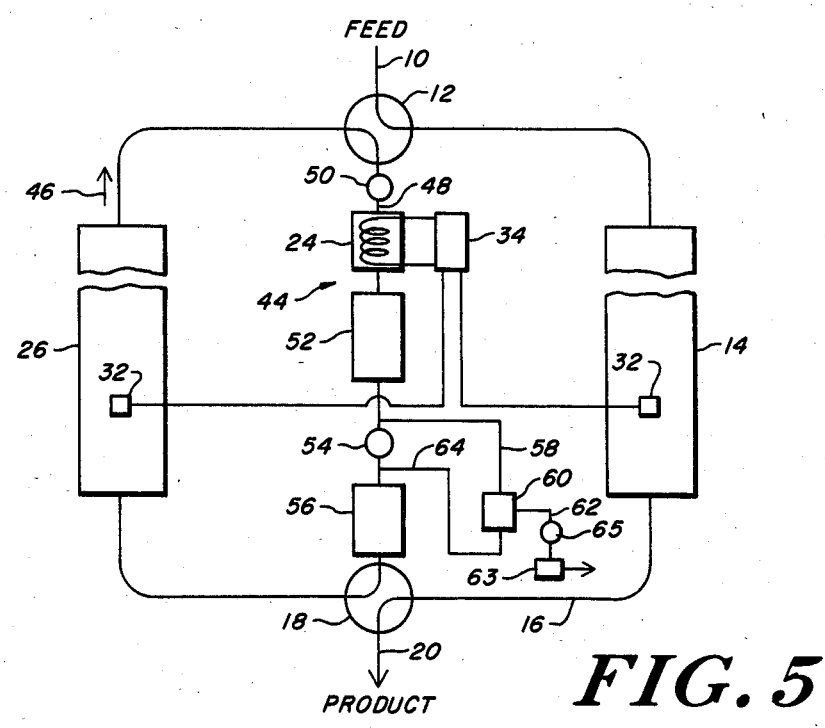
FIG. 5 is a schematic diagram illustrating apparatus constructed in accordance with the invention employing recirculation regeneration.

Referring to FIG. 5, a second embodiment of apparatus embodying the invention is illustrated. The embodiment of FIG. 5 illustrates a recirculating regeneration loop. Feed from line 10 passes through valve 12, and main bed 14; product passes along product line 16, through valve 18, and line 20. The bed 14 operates identically to bed 14 in FIG. 4.

The regeneration loop 44 passes hot regenerant and coolant through main bed 26 in the direction of arrow 46 countercurrent to the flow in bed 14. Regeneration and sorbate recovery loop 44 comprises a conduit 48 which is fed by fluid from bed 26, passes fluid through valve 12, through a series of components described below, through valve 18, and back into bed 26. In conduit line 48 between the valves is a fluid mover 50, a heater 24 a second sorption bed 52, a valve 54, and a third bed 56. A branch line 58 is connected to conduit 48 at a point between second bed 52 and valve 54. Branch line 58 feeds a sorbate collector 60 which may comprise, for example, a condenser which condenses sorbate and cools regenerant fluid. An absorber or a distillation apparatus may be integrated in the line, e.g., as shown at 63. Sorbate fractions produced in collector 60 are recovered through line 62 serviced by valve 65. Recirculating fluid of a reduced sorbate content contained in the output fluid of the collector is delivered through line 64 back into conduit 48 upstream of a third sorption bed 56. When valve 54 is open, recirculating fluid bypasses collector 60; when it is closed, collector 60 is on line. As described with reference to the embodiment of FIG. 4, the heater 24 may be inactivated when appropriate by controller 34, which in turn is responseive during regeneration to thermal probe 32 disposed in bed 26.

The primary function of the second bed (here bed 52) is to promote separation of sorbates trapped in the main beds during the sorption stage. The primary function of third bed 56 is to improve the overall recovery of sorbate mass. Before turning to a discussion of the operation of regeneration loop 44, it should also be noted that the foregoing arrangement of components in conduit 48 is merely illustrative and is not intended to limit the invention, except as set forth in the claims which follow.

Referring to FIGS. 6A-6F, main bed 26, heater 24, second bed 52, collector 60 with its associated valve, and third bed 56 are schematically illustrated in the order they appear in FIG. 5. The vertical axes of the beds represents increased loading.

Figure 6A:
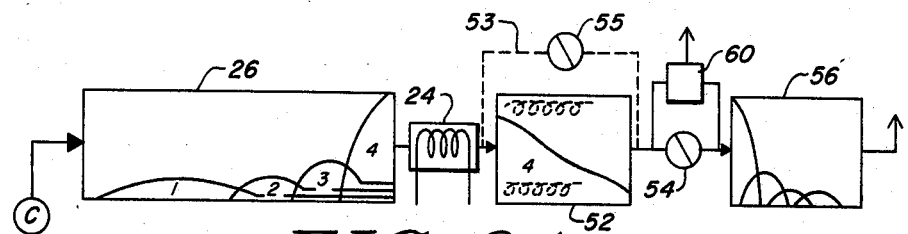
FIG. 6A-6F are schematic diagrams illustrating sorbent loading profiles in a main bed, a second bed, and a third bed arranged in accordance with the embodiment of the invention of FIG. 5 wherein the vertical axes of the beds represent increasing (upward) loading of various sorbates.

At the outset of the regeneration and sorbate recovery stage, as depicted in FIG. 6A, main bed 26 contains four regions of sorbate loading labled 1-4. The respective sorbates may be, for example, pentane (1), Hexane (2), heptane (3) and water (4). Of these sorbates, pentane has the lowest affinity for sorbent materials, e.g., silica gel or activated alumina, hexane has a higher affinity, heptane still higher, and water the highest. The loading regions separate as shown because during sorption fluid passes from right to left in bed 26, and the loaded region of pentane travels farthest, followed by hexane, heptane and water. Still higher molecular weight petroleum fractions, if present in the fluid feed, would have loading profiles in or about regions 3 and 4. Lower molecular weight fractions, if any, have broken through the bed in the situation illustrated. The loading profiles rise and fall along the bed length because during sorption sorbates upstream tend to displace those downstream.

It should be noted that the size of the bed, the particular sorbent material used in the bed, fluid flow rates, and cycle times may all be set, and in any specific design should be set, so as to optimize capture and subsequent separation of the particular mixture of sorbates of interest. In general, high fluid flow rates, long cycle times, and short bed flow paths tend to promote breakthrough of sorbates of low affinity for the sorbent material. Longer bed-flow paths enable the entrapment of a greater number of sorbents.

Regarding the relative size of the beds, the second bed need be only a fraction of the size of the main bed, and the third bed, if employed, need be large enough only to trap sorbates not removed by the collector 60.

At the beginning of regeneration, bed 52 may contain loading of sorbate 4, shown partially broken through, which is produced in late phases of the regeneration stage as disclosed hereinafter. In some embodiments of the method of the invention, second bed 52 will be substantially sorbate-free at the beginning of regeneration. Bed 56 is loaded in this case with sorbates 1–4 as shown, which loadings are produced in late phases of the regeneration stage as disclosed below.

Figure 6B:
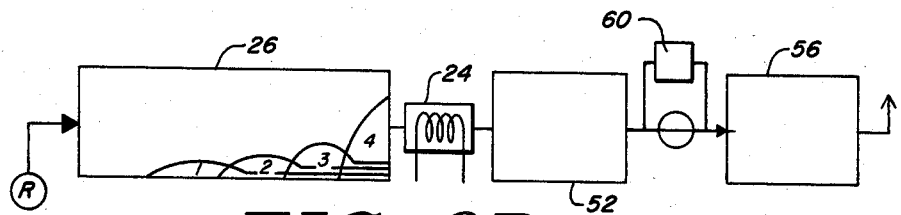

When heater 24 is activated to begin regeneration, cool fluid within the beds starts to circulate and is heated as it passes heater 24. Hot regenerant fluid first enters bed 52, heats the sorbent mass contained therein, and creates an RW front which sweeps sorbate 4 along the flow path of bed 52, regenerating it. Optionally, before substantial amounts of sorbate 4 leave the bed 52, valve 54 is closed and the sorbate collector 60 is put on line. In that case collector 60 removes a sorbate fraction rich in sorbate 4 (FIG. 6B).

If valve 54 is open during the time heater 24 is activated, a sorbate 4-rich pulse of effluent will emerge from bed 52, pass through bed 56 stripping sorbates 1, 2, 3 and 4 therefrom, and deposit sorbate loadings on the product exit (regenerant entrance) end of bed 26. In this circumstance, sorbate 4, having the greatest affinity for the sorbent material in bed 26, may never exit bed 26 during the regeneration stage. This raises the possibility that sorbate 4 may be swept into the product stream 20 when bed 26 is returned to sorption duty. To prevent this, the effluent exiting second bed 52 should either be removed as set forth above or should be conditioned such that its sorbate content is more uniform and its temperature is high. These objectives may be achieved in at least two ways. First, a heater (shown in phantom in FIG. 6A) may be placed in association with sorbent material within bed 52. Second, bed 52 may be fitted with a bypass line 53 and associated valve 55 (shown in phantom in FIG. 6A). In the former case, the internal heater may comprise the only heater in the recirculation loop, i.e., may replace heater 24. In the latter case, opening valve 55 during regeneration of bed 52 has the effect of mixing hot gas with effluent leaving bed 52. Further particulars regarding operation of both these methods of conditioning the effluent are disclosed in copending application Ser. No. (484,176).

During this time, fluid circulating in the remainder of the recirculating loop has not reached the temperature of the regenerant, and accordingly little desorpiton occurs in the main bed 26 or third bed 56.

As hot fluid begins to emerge from the effluent end of bed 52, hot regenerant enters bed 56 creating desorption fronts which sweep, respectively and essentially sequentially, sorbates 1, 2, 3, and 4 from bed 56. During this period valve 54 is open, taking collector 60 off line, as little sorbate is contained in the fluid streams which would otherwise pass through collector 60. Furthermore, the effect of maintaining the condenser or other means for collecting sorbate on line would be to introduce inefficiencies in the system by removing needed heat from the regenerant fluid.

The sorbates 1, 2, 3, and 4 from bed 56 are carried by the recirculating fluid stream into bed 26. As will be explained in more detail below, the mass of sorbates swept from bed 56 is small relative to the sorbent mass in bed 26, and can accordingly be ignored in discussing the operation of bed 26 during desorption. However, it should be noted that the sorbates stripped from bed 56 are ultimately collected and recovered during the regeneration of bed 26.

At this point in the regeneration stage, beds 52 and 56 have been regenerated, and hot regenerant fluid enters main bed 26 (FIG. 6B). The hot regenerant stream produces RW and WF fronts which traverse the bed. Sorbate 1, being the easiest to sorb, and first encountered, is stripped off first and a waste plateau rich in sorbate 1, but also containing small concentrations of sorbates 2, 3, and 4, fills the downstream end of the bed. The first WF front exits bed 26, and fluid at a lower temperature than the hot regenerant containing a major amount of sorbate 1 and minor amounts of sorbates 2, 3, and 4 passes through heater 24 and enters hot dry second bed 52.

Waste entering bed 52 is at a significantly lower temperature than the sorbent material in bed 52 and thus forms a very fast leading front that traverses hot bed 52, hot bed 56, the hot region in equilibrium with regenerant in main bed 26, and redeposits on the main bed where it encounters lower temperature regions. The effect is to cool beds 52 and 56, and to concentrate the sorbate loading regions in main bed 26.

At a time during the regeneration cycle when an RW front or fronts are still in main bed 26, in accordance with the Four Front operational method, there is sufficient heat contained in the fluid stream and the beds to complete the desorption of bed 26. Heater 24 is accordingly inactivated and valve 54 is closed, placing sorbate collector 60 on line. Because of the characteristics of sorption and desorption and the front mechanics disclosed above, warm fluids containing sorbate continue to exit main bed 26.

Figure 6C:
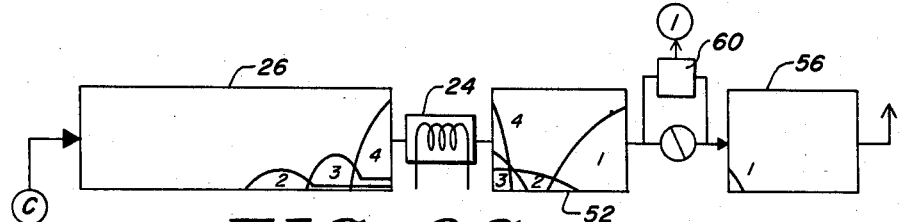

In bed 52, there are produced sorption fronts which are somewhat faster and produce lower concentration loaded regions because of the higher than ambient temperature of the bed 52. However, sorbates 2, 3, and 4, because of their increasingly greater affinity for the sorbent material in bed 52 have a longer residence time in bed 52 than does sorbate 1. The result is the breakthrough of fluid rich in sorbate 1 (FIG. 6C). Accordingly, the effect of bed 52 is further to separate sorbate 1 from the others. This enables collection in collector 60 of a liquid sorbate fraction comprising sorbate 1 containing a small amount of sorbate 2 and even smaller amounts of sorbates 3 and 4. If, as implied in FIGS. 6A–6F, collector 60 has some inefficiency, a portion of the sorbate 1 in the fluid stream will not be removed. That portion passes into bed 56 and is sorbed (FIG. 6C).

Figure 6D:
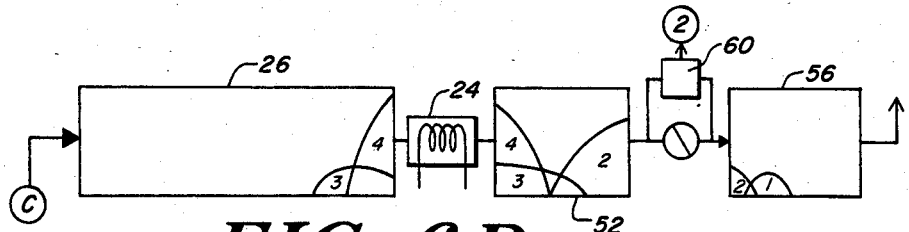

As recirculation continues, the RW front associated with sorbate 1 breaks completely through bed 52, the WF front in bed 26 associated with sorbate 2 exits the bed, and the fluid, containing a high concentration of sorbate 2, and small concentrations of sorbates 3 and 4, enters bed 52. There, sorbates 3 and 4 are sorbed preferentially and fluid rich in sorbate 2 exits bed 52 and is collected in collector 60. Again, any sorbate not removed in collector 60 is trapped in third bed 56 (FIG. 6D).

Figure 6E:
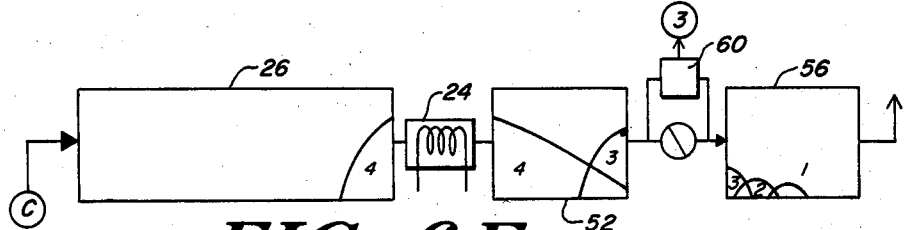
Figure 6F:
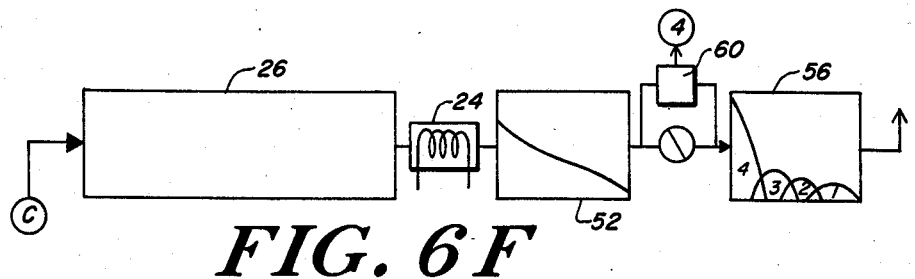

Continued circulation produces fluid exiting bed 52 rich in sorbate 3 which is collected as illustrated in FIG. 6E. At some point in the late stages of the regeneration and sorbate recovery cycles, sufficient sensible heat has been removed from the recirculating fluid such that cool fluid enters main bed 26, cools the bed, and may collide with the last vestiges of the slowest RW front adjacent the bed exit. Bed 52 is then cool, and as illustrated, may still contain a substantial loading of sorbate 4. Portions of sorbate 1, 2, 3, and 4 not removed by collector 60 are trapped in bed 56. In other embodiments of the method of the invention where heater 24 is turned off later, sufficient heat may remain in the loop to substantially or completely remove sorbate 4 from bed 52. In that case, in the embodiment shown, bed 52 in FIG. 6A would have a decreased or substantially zero loading of sorbate 4.

At this point in the cycle, valves 12 and 18 are rotated, and the cycle is repeated.

The operation of the embodiment of FIG. 4 is similar to that set forth above. Thus, fluid passing out of main bed 26 of FIG. 4 containing a major concentration of one sorbate is passed through bed 30 with the same concentrating effect as described with reference to bed 52 in the embodiment of FIG. 5. Heater 24 is inactivated while an RW front is still in bed 26. Sorbate fractions rich in one of a plurality of the sorbates trapped in bed 26 during the sorption stage are collected in collector 36. The fractions may be sequentially removed from collector 26 by periodically opening valve 38. Unlike the recirculation regeneration embodiment, the embodiment of FIG. 4 has no need for a third bed because sorbates, if any, in the fluid stream 42 exiting the collector are returned to the feed line 10 and ultimately captured by bed 14 in sorption duty. Also, in the embodiment of FIG. 4, bed 30 may be cooled by product before sorbate loading begins.

As will be apparent from the foregoing, third bed 52 is an optional component in the recirculation regeneration embodiment. If collector 60 is efficient enough to remove substantially all of the sorbate passing through it, bed 52 may be omitted. Bed 52 may also be omitted if a certain amount of sorbates can be tolerated in the product. In the absence of bed 52, sorbates escaping the collector will redeposit in main bed 26, and on return to the countercurrent sorption duty flow, will be swept out in the product stream 20.

Figure 7:
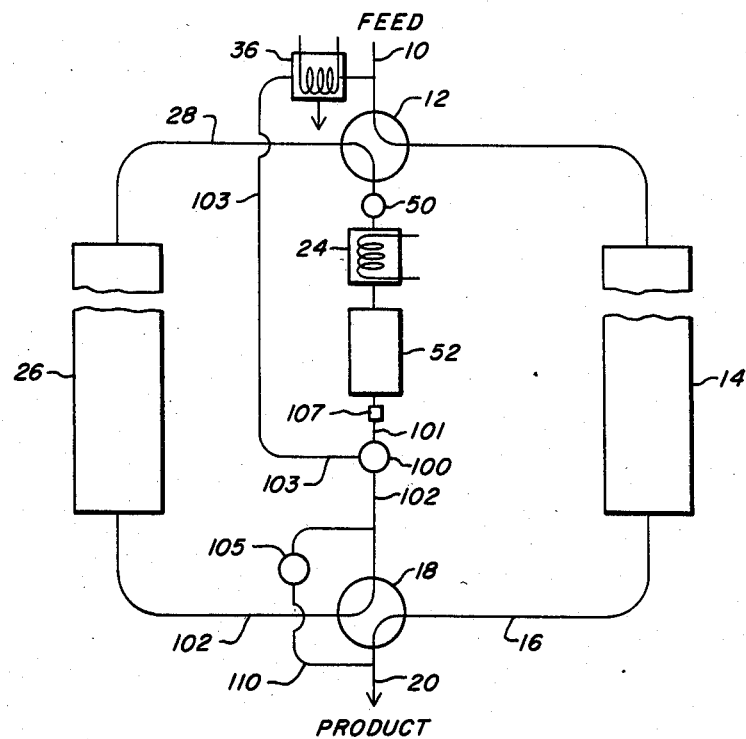
FIG. 7 is a schematic diagram illustrating another apparatus constructed in accordance with the invention.

Referring to FIG. 7, another exemplary embodiment of the invention is shown, which during regeneration heats with a recirculating stream and cools the main beds and collects sorbate with a stream taken from product. It comprises main beds 14 and 26, valves 12 and 18 for reversing the roles of the main beds, and regeneration apparatus comprising a sorbate collector 36, a fluid mover 50, a heater 24, and a second bed 52. Valve 100 is of the type that, in one configuration, opens a line between stream 101 and 102, and in another, opens a line between stream 101 and 103.

When bed 26 is placed in the regeneration stage as shown, at the outset heater 24 is activated, sorbate collector 36 is inactivated (or taken off line with appropriate valving), fluid mover 50 is activated, valve 100 is set to connect lines 101 and 102, and valve 105 is closed. As fluid moved by fan 50 passes through heater 24, the fluid is heated, regenerating (if necessary) and heating up bed 52. Hot regenerant eventually exits bed 52, passes through line 101, valve 100, and line 102, and enters bed 26. At some point when an RW front remains in bed 26, heater 24 is inactivated. Warm effluent exiting bed 26 through line 28 passes through the now inactivated heater and enters bed 52 which is cooled and loaded with sorbate. When thermal sensor 107 indicates that the effluent from second bed 52 has reached a selected low temperature, valve 100 is switched to connect line 101 with line 103 and valve 105 is opened.

Thereafter, cool product flows from line 20 through line 110, valve 105, and line 102 and enters main bed 26. Waste exiting through line 28 loads bed 52. Its effluent, a sequence of fluid pulses rich in a selected one of the sorbates originally deposited on main bed 26, passes through valve 100 and line 103, and enters sorbate collector 36. Any sorbate escaping collector 36 is fed back to feed line 10. When the PR cooling front has traversed bed 26, the last of the slowest RW front emerges from the bed exit. At that point valves 12 and 18 place now loaded bed 14 in regeneration and now regenerated bed 26 in sorption.

The invention may be embodied in other specific forms without departing from the spirit and scope thereof. Accordingly, other embodiments are within the following claims.

What is claimed is:

1. A method of treating a fluid feed stream containing a mixture of dilute sorbates to obtain a plurality of separate fractions each of which is rich in a selected one of said sorbates, said method comprising the steps of:
   A. passing said fluid stream through a main bed containing a sorbent material to load said sorbates onto said sorbent material in a series of zones rich in a selected one of said sorbates;
   B. passing a hot regenerant fluid through said main bed countercurrent to said fluid feed stream so as to produce slow desorption front in said bed;
   C. passing a cooling gas stream through said main bed cocurrent to said hot regenerant stream to produce a fast cooling front in said bed, said cooling gas stream being introduced into said bed prior to the time said desorption front leaves the bed;
   D. passing effluent exiting said bed during step C through a second bed containing sorbent material; and
   E. collecting separate sorbate fractions rich in a selected one of said sorbates from effluent exiting said second bed in means for collecting said sorbate fractions.

2. The method of claim 1 wherein said fluid feed stream comprises natural gas containing a mixture of sorbates selected from the group consisting of petroleum fractions, acid gases, and ammonia.

3. The method of claim 2 wherein said collecting step is effected by passing sequential portions of effluent exiting said second bed through means ior collecting sorbate comprising a condenser.

4. The method of claim 3 wherein said means for collecting sorbate comprising an absorber.

5. The method of claim 3 wherein said means for collecting sorbate comprising a distillation apparatus.

6. The method of claim 1 wherein said effluent exiting said second bed is recirculated through said first bed to produce a recirculating fluid stream, said method comprising the additional steps of heating said recirculating fluid stream prior to step B and cooling said recirculating fluid stream prior to step C.

7. The method of claim 6 wherein said recirculating fluid stream exiting said means for collecting sorbate includes a dilute sorbate, said method comprising the additional step of passing said recirculating fluid stream through a third bed containing sorbent material prior to recirculating said stream through said main bed.

8. The method of claim 6 wherein said fluid feed stream comprises natural gas containing a mixture of sorbates selected from the group consisting of petroleum fractions, acid gases, and ammonia.

9. The method of claim 7 wherein said fluid feed stream comprises natural gas containing a mixture of sorbates selected from the group consisting of petroleum fractions, acid gases, and ammonia.

10. The method of claim 1 wherein during regeneration and prior to step B, said second bed is regenerated by said hot regenerant fluid.

11. The method of claim 7 wherein during regneration and prior to step B said third bed is regenerated by said hot regenerant fluid.

12. A method of treating a natural gas stream containing a mixture of dilute sorbates to obtain a plurality of separate fractions each of which is rich in a selected one of said sorbates, said method comprising the steps of:
A. passing said natural gas stream through a main bed containing a sorbent material to load said sorbates onto said sorbent material in a series of zones rich in a selected one of said sorbates;
B. recirculating a hot regenerant fluid through said main bed countercurrent to said natural gas stream so as to produce a slow desorption front in said bed;
C. passing a cooling gas stream through said main bed cocurrent to said hot regenerant stream to produce a fast cooling front in said bed, said cooling gas stream being introduced into said bed prior to the time said desorption front leaves the bed;
D. passing effluent exiting said main bed during step C through a second bed containing sorbent material; and
E. collecting separate sorbate fractions rich in a selected one of said sorbates from effluent exiting said second bed in means for collecting said separate sorbate fractions ccmprising a condenser.

13. The process of claim 12 wherein said hot regenerant stream is produced by heating recirculating fluid in a heater located downstream of said main bed and upstream of said second bed.

14. The process of claim 12 wherein said means for collecting sorbate leaves residual sorbate in said effluent, said process comprising the additional step of passing effluent containing said residual effluent through a third bed.

15. The process of claim 12 wherein said cooling gas stream is a recirculating stream.

16. The process of claim 12 comprising the additional step of passing effluent from said main bed through said second bed prior to step C, said effluent being effective to cool said second bed.

* * * * *